(12) United States Patent
Kikuchi (10) Patent No.: US 10,863,051 B2
(45) Date of Patent: Dec. 8, 2020

(54) IMAGE FORMING APPARATUS WHICH DETECTS AN OVERRUN

(71) Applicant: KYOCERA Document Solutions Inc., Osaka (JP)

(72) Inventor: Ryota Kikuchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/536,145

(22) Filed: Aug. 8, 2019

(65) Prior Publication Data

US 2020/0053245 A1 Feb. 13, 2020

(30) Foreign Application Priority Data

Aug. 10, 2018 (JP) ................................. 2018-151629

(51) Int. Cl.
*G06K 15/00* (2006.01)
*H04N 1/21* (2006.01)
*G06F 3/06* (2006.01)
*H04N 1/00* (2006.01)

(52) U.S. Cl.
CPC ......... *H04N 1/2104* (2013.01); *G06F 3/0604* (2013.01); *G06F 3/0656* (2013.01); *G06F 3/0679* (2013.01); *H04N 1/00037* (2013.01); *H04N 1/00082* (2013.01); *H04N 1/00588* (2013.01); *H04N 2201/0094* (2013.01)

(58) Field of Classification Search
None
See application file for complete search history.

(56) References Cited

U.S. PATENT DOCUMENTS 6,369,910 B1 * 4/2002 Mitani ................... G06K 15/02
358/1.13
2014/0215119 A1 * 7/2014 Fujii ..................... G06F 3/0638
711/5

FOREIGN PATENT DOCUMENTS

JP 2006-297735 A 11/2006

* cited by examiner

*Primary Examiner* — Henok Shiferaw
(74) *Attorney, Agent, or Firm* — Studebaker & Brackett PC (57) ABSTRACT

An image forming apparatus includes first storage, a writing controller, a reading controller, a conveyance section, a detector, and a main controller. The conveyance section conveys a recording medium. The detector detects an overrun. Write addresses are designated in a predefined sequence from among addresses. Read addresses are designated in the predefined sequence from among the addresses. The writing process and the reading process are performed in storage areas included in the first storage in a first order. The overrun indicates that the writing and reading processes are performed in the storage areas included in the first storage in a second order that is opposite to the first order. While the conveyance section conveys the recording medium, the main controller controls the writing controller or the reading controller based on a detection result of the detector.

5 Claims, 6 Drawing Sheets

IMAGE FORMING APPARATUS WHICH DETECTS AN OVERRUN

INCORPORATION BY REFERENCE

The present application claims priority under 35 U.S.C. § 119 to Japanese Patent Application No. 2018-151629, filed on Aug. 10, 2018. The contents of this application are incorporated herein by reference in their entirety.

BACKGROUND

The present disclosure relates to an image forming apparatus.

In an image forming apparatus, a writing controller (a main central processing unit (CPU), for example) writes data in storage areas specified by addresses starting from addresses A in a predefined sequence so as to write data a1 in a storage area specified by an address A and then write data b1 in a storage area specified by an address B. A reading controller (an engine CPU, for example) reads the data in the storage areas specified by the addresses starting from the address A in a predetermined sequence so as to read the data a1 from the storage area specified by the address A and then read the data b1 from the storage area specified by the address B.

When a printing process is performed, the reading controller reads data after the writing controller has written data in a certain storage area. However, an "overrun" occurs in a case where progress of a writing process through which data is written is slower than progress of a reading process through which data is read. For example, the reading controller reads old data b0 in the storage area specified by the address B before the writing controller writes the data b1.

An image forming apparatus is known which detects an overrun. The image forming apparatus includes a detector, a print buffer, and a printing section. The detector detects an overrun by monitoring the state of the print buffer and the state of the printing section.

SUMMARY

An image forming apparatus according to an aspect of the present disclosure includes first storage, a writing controller, a reading controller, a conveyance section, a detector, and a main controller. The first storage includes a plurality of storage areas specified by a plurality of addresses. The writing controller performs a writing process through which data is written piece by piece to storage areas specified by write addresses among the storage areas. The reading controller performs a reading process through which data stored in storage areas specified by read addresses among the storage areas is read piece by piece. The conveyance section conveys a recording medium. The detector detects an overrun. The main controller controls the writing controller and the reading controller. The write addresses are specified in a predefined sequence from among the addresses. The read addresses are specified in a predefined sequence from among the addresses. The writing process and the reading process are performed in the storage areas included in the first storage in a first order. The overrun indicates that the writing process and the reading process are performed in the storage areas in a second order that is opposite to the first order. While the conveyance section conveys the recording medium, the main controller controls the writing controller or the reading controller based on a detection result of the detector.

DETAILED DESCRIPTION

The following describes an embodiment of the present disclosure with reference to the accompanying drawings. Elements that are the same or equivalent are labeled with the same reference signs in the drawings and description thereof is not repeated.

Figure 1:
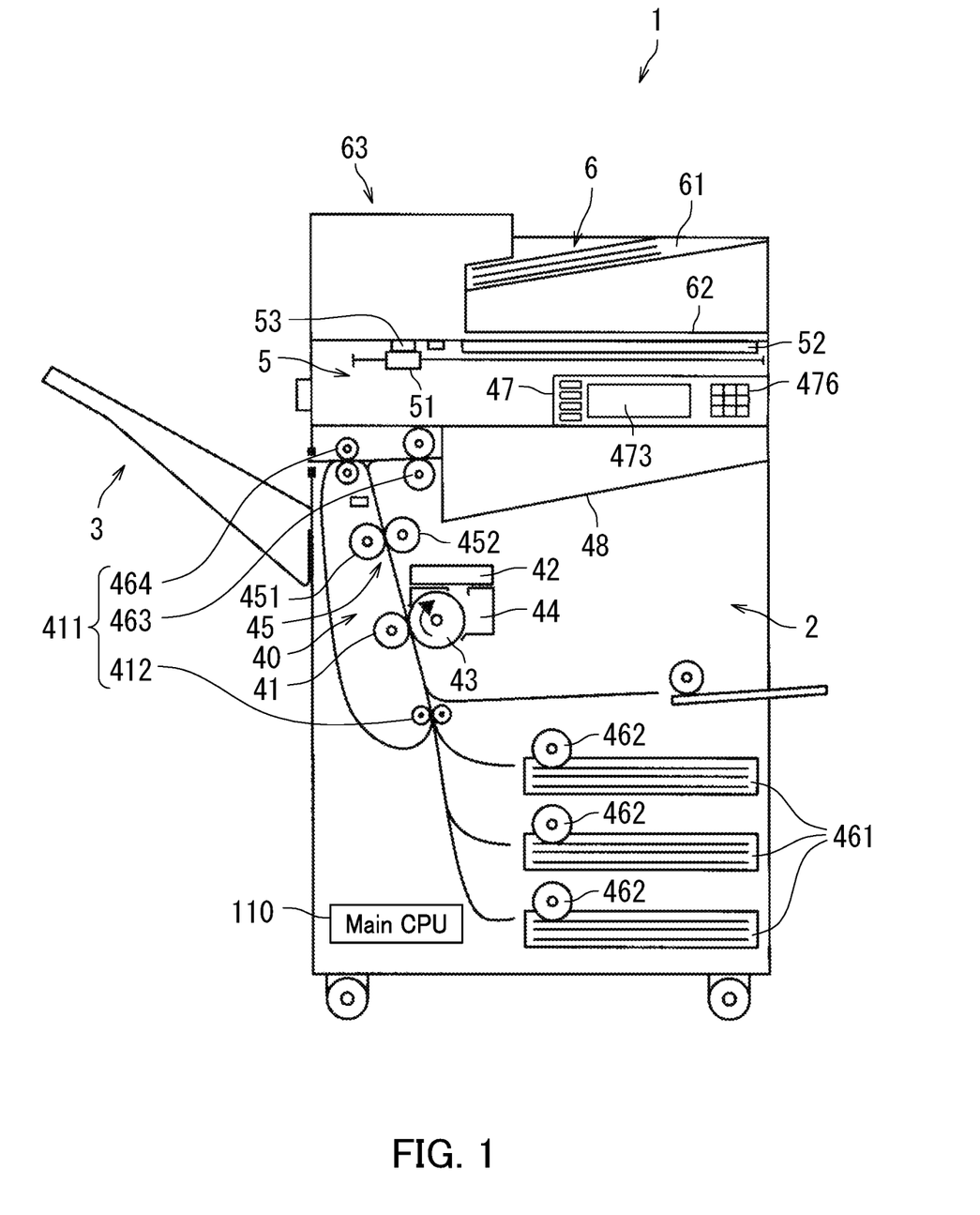
FIG. 1 is a configuration diagram illustrating an example of an image forming apparatus according to an embodiment of the present disclosure.

FIG. 1 is a configuration diagram illustrating an example of an image forming apparatus according to the present embodiment. According to the present embodiment, the image forming apparatus is a multifunction peripheral 1. The multifunction peripheral 1 includes a combination of functions of a scanner, a copier, a printer, and a facsimile machine. It should be noted that the image forming apparatus is not limited to the multifunction peripheral 1, and may be a copier, a printer, or a facsimile machine.

The multifunction peripheral 1 includes a main body 2, a stacking tray 3, a document reading section 5, a document feed section 6, an operation panel 47, and a main CPU 110. The document feed section 6 is an example of a conveyance section. The main CPU 110 is an example of a main controller.

The stacking tray 3 is a place where paper is ejected. The stacking tray 3 is located to the left of the main body 2, for example.

The operation panel 47 is operated by a user. The operation panel 47 is provided on a front portion of the multifunction peripheral 1. The operation panel 47 is rectangular, for example. The operation panel 47 includes a display section 473 and operation keys 476. The display section 473 is for example a liquid-crystal display with a touch panel function. The operation keys 476 include various key switches, for example.

The document feed section 6 feeds a document. The document feed section 6 is located above the document reading section 5, for example. The document feed section 6 includes a document loading tray 61, a document exit tray 62, and a document conveying mechanism 63. The document conveying mechanism 63 feeds the document loaded on the document loading tray 61 a sheet at a time, conveys the document to the document reading section 5, and ejects the document to the document exit tray 62. The document is an example of a recording medium.

The document reading section 5 reads the document. The document reading section 5 is located above the main body 2, for example. The document reading section 5 includes a scanner 51, a document table 52 including a transparent glass member, and a document reading slit portion 53. The scanner 51 is movable by a drive section. For example, when the document loaded on the document table 52 is read, the scanner 51 is moved along a surface of the document in a position facing the document table 52. As a result, the scanner 51 acquires image data.

In reading the document fed by the document feed section 6, the scanner 51 is moved to a position facing the document reading slit portion 53. The scanner 51 then sequentially acquires image data through the document reading slit portion 53 in synchronization with a document conveyance operation by the document feed section 6.

The main body 2 includes a plurality of paper feed cassettes 461, sheet feed rollers 462, and an image forming section 40. The sheet feed rollers 462 feed paper from the paper feed cassettes 461 a sheet at a time and convey the paper to the image forming section 40. The paper is an example of a recording medium. The image forming section 40 forms an image on the paper conveyed from the paper feed cassettes 461.

The image forming section 40 forms an image on the paper. The image forming section 40 includes a paper conveyance section 411, an optical scanning device 42, a photosensitive drum 43, a development section 44, a transfer section 41, and a fixing section 45.

The paper conveyance section 411 conveys the paper. The paper conveyance section 411 is provided in a paper conveyance path inside the image forming section 40. The paper conveyance section 411 includes conveyance rollers 412, 463, and 464. The conveyance roller 412 supplies the paper conveyed by the sheet feed rollers 462 to the photosensitive drum 43. The conveyance rollers 463 and 464 convey the paper to the stacking tray 3 or an exit tray 48.

The optical scanning device 42 forms an electrostatic latent image on the photosensitive drum 43 by exposing the photosensitive drum 43 with output laser light based on image data. The development section 44 develops the electrostatic latent image on the photosensitive drum 43 with toner to form a toner image. The transfer section 41 transfers the toner image from the photosensitive drum 43 to the paper.

The fixing section 45 applies heat and pressure to the paper to which the toner image has been transferred, thereby fixing the toner image to the paper. The fixing section 45 includes a heating roller 452 and a pressure roller 451. The heating roller 452 melts toner of the toner image formed on the paper. The pressure roller 451 conveys the paper while pressing the paper against the heating roller 452.

Figure 2:
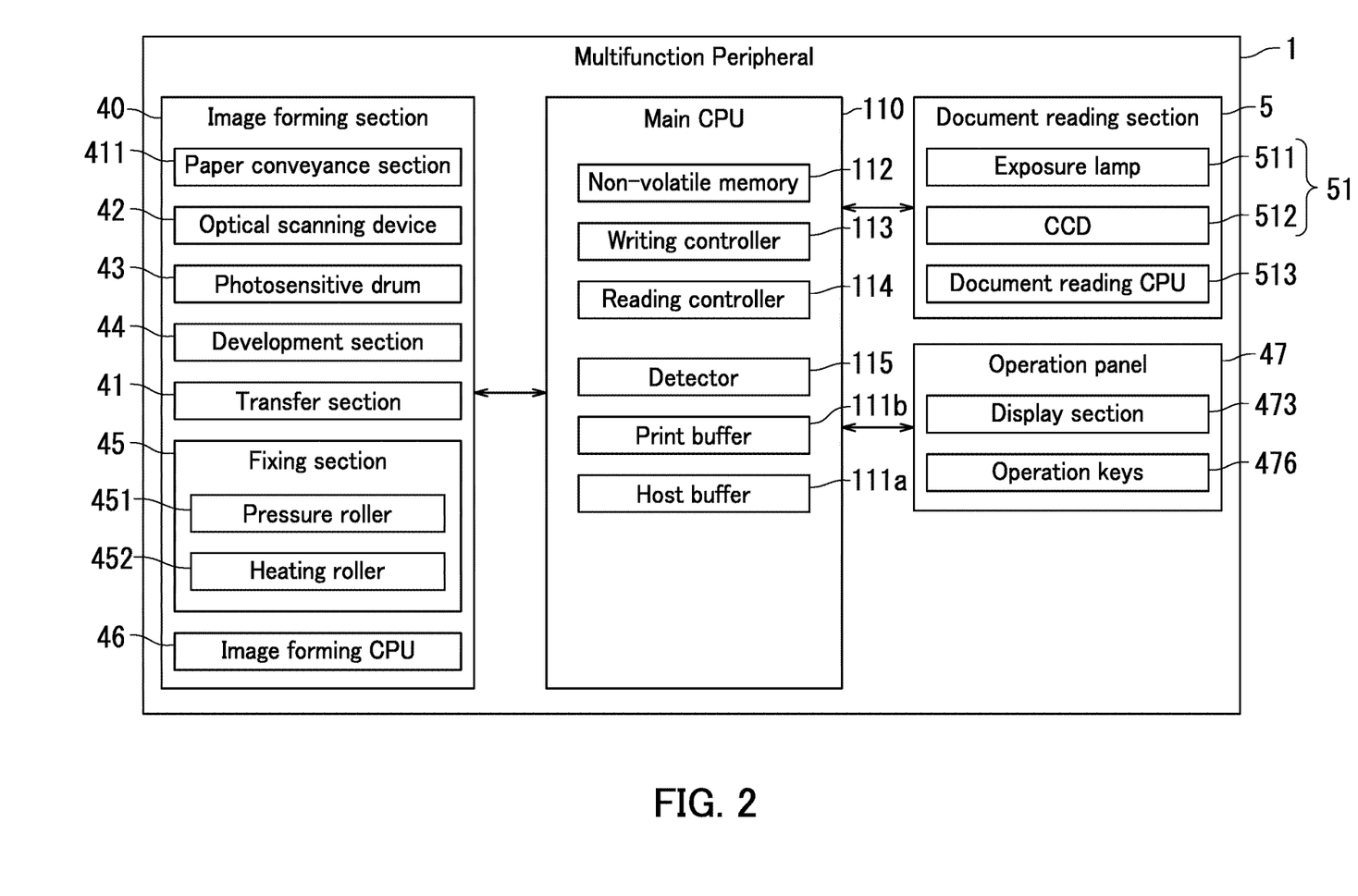
FIG. 2 is a block diagram illustrating an example of an internal configuration of the image forming apparatus illustrated in FIG. 1.

FIG. 2 is a block diagram illustrating an example of an internal configuration of the multifunction peripheral 1 illustrated in FIG. 1. The following mainly describes elements of configuration newly illustrated in FIG. 2 with reference to FIG. 2.

The main CPU 110 controls the entirety of the apparatus. The main CPU 110 includes a host buffer 111a, a print buffer 111b, non-volatile memory 112, a writing controller 113, a reading controller 114, and a detector 115. The host buffer 111a and the print buffer 111b are examples of first storage. The non-volatile memory 112 is an example of second storage. According to the present embodiment, the writing controller 113 and the reading controller 114 are implemented by the main CPU 110 executing a storage control program. The storage control program is software for a writing process and a reading process. The writing controller 113 and the reading controller 114 may also be configured as hardware.

The host buffer 111a is storage having storage areas in which image data may be overwritten by other new image data. The storage areas of the host buffer 111a are specified by a plurality of addresses. The storage areas each are an example of a save area.

The host buffer 111a includes random-access memory (RAM), and is a ring buffer, for example. A ring buffer is a buffer conceptually configured in a ring shape by logically linking both ends of a plurality of storage areas. That is, among the storage areas including a storage area with a starting address A and a storage area with an ending address K in the ring buffer, once the address of a storage area to be written to or read from reaches the address K, the next address to be written to or read from is the address A.

The print buffer 111b is storage in which image data in a storage area may be overwritten by other new image data. The print buffer 111b includes a plurality of storage areas specified by a plurality of addresses. The print buffer 111b also includes RAM and is a ring buffer, for example.

The non-volatile memory 112 is an example of the second storage. The non-volatile memory 112 stores predetermined data. The predetermined data is for example image data indicating blank space. Image data indicating blank space is image data containing no objects to be printed in a printing process. The non-volatile memory 112 includes electrically erasable programmable read-only memory (EEPROM).

The document reading section 5 further includes a document reading CPU 513. The document reading CPU 513 is an example of a writing controller. The scanner 51 includes a charge-coupled device (CCD) 512 and an exposure lamp 511.

When the scanner 51 acquires image data, the document reading CPU 513 outputs the image data to the main CPU 110. Specifically, the document reading CPU 513 performs a writing process. The document reading CPU 513 may be implemented by executing a program which is software for the writing process, or may be configured as hardware. In the writing process, the document reading CPU 513 writes image data to a predetermined storage area of the host buffer 111a. When the scanner 51 sequentially acquires image data, the document reading CPU 513 sequentially writes the image data piece by piece to predetermined storage areas of the host buffer 111a.

The image forming section 40 further includes an image forming CPU 46. The image forming CPU 46 is an example of a reading controller.

The image forming CPU 46 performs a reading process. The image forming CPU 46 may be implemented by executing a program which is software for the reading process, or may be configured as hardware. In the reading process, the image forming CPU 46 sequentially reads image data piece by piece from predetermined storage areas of the print buffer 111b of the main CPU 110.

Figure 3:
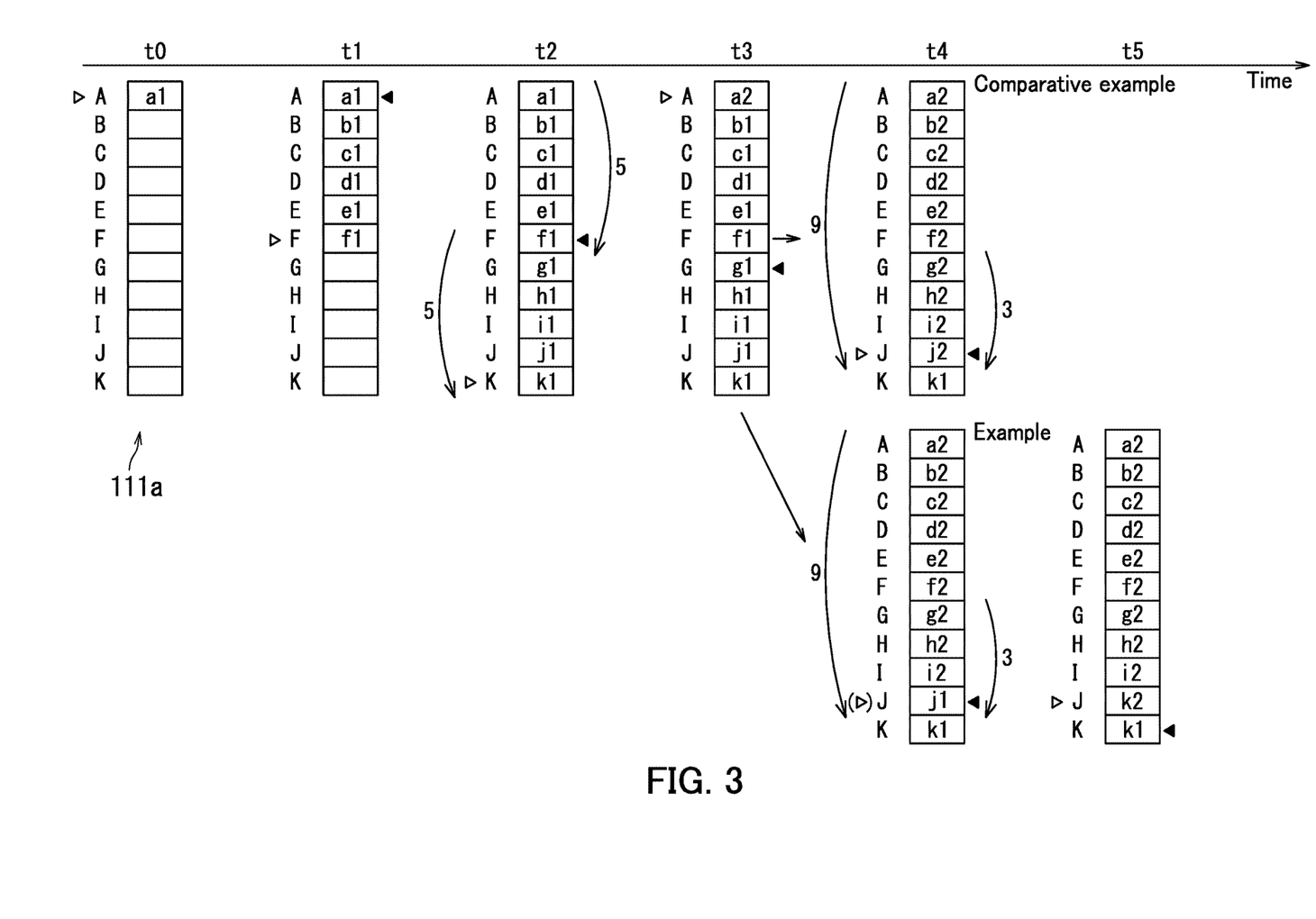
FIG. 3 is a diagram for describing a writing process performed by a document reading CPU and a reading process performed by a main CPU according to the present embodiment.

The following describes the writing process performed by the document reading CPU 513 and the reading process performed by the main CPU 110 with reference to FIG. 3. FIG. 3 is a diagram for describing the writing process performed by the document reading CPU 513 and the reading process performed by the main CPU 110 according to the present embodiment. In FIG. 3, a horizontal axis indicates time. For convenience, addresses A to K are assigned to the storage areas of the host buffer 111a in order from the top. Due to the constraints of the drawing surface, only eleven storage areas are shown in the host buffer 111a illustrated in FIG. 3. However, the number of the storage areas is not limited. Furthermore, the reference sign "111a" is omitted at times t2 to t5. In the writing process of the document reading section 5, the scanner 51 sequentially acquires image data in synchronization with the document conveyance operation by the document feed section 6.

The document reading CPU 513 designates write addresses and writes image data piece by piece to storage areas specified by the designated write addresses in a predefined sequence. Writing pointers (white triangles in the diagram) each indicate the write address to which the image data is written.

The predefined sequence is a sequence in which the addresses of the host buffer 111a are serially assigned from the starting address A to the ending address K. The first write address is for example the starting address A of the host buffer 111a as illustrated at time t0.

Specifically, when image data is written to a storage area specified by a write address in the host buffer 111a, the document reading CPU 513 advances a writing pointer by one address to move a writing target to the next address. Thereafter, as illustrated at time t1, the document reading CPU 513 writes image data to the host buffer 111a and then advances the writing pointer by one address. Then, when the writing pointer has reached the ending address K of the host buffer 111a as illustrated at time t2, the document reading CPU 513 writes image data and then returns the writing pointer to the starting address A as illustrated at time t3.

The reading controller 114 of the main CPU 110 performs the reading process. In the reading process, the reading controller 114 designates read addresses and reads image data piece by piece from the storage areas specified by the read addresses in the predefined sequence from a predefined start timing after the performance of the writing process of the document reading CPU 513 has been started. Upon reading the image data, the reading controller 114 stores the image data in the non-volatile memory 112. Reading pointers (black triangles in the diagram) each indicate the read address from which the image data is read. The predefined start timing is time t1. Time t1 is one second after time t0, for example.

Specifically, when image data is read from the storage area specified by the read address indicated by a reading pointer, the reading controller 114 advances the reading pointer by one address to move a reading target to the next address. Thereafter, as illustrated at times t2 and t3, the reading controller 114 reads image data from the host buffer 111a and then advances the reading pointer by one address. Then, once the reading pointer reaches the ending address K of the host buffer 111a, the reading controller 114 reads the image data and then returns the reading pointer to the starting address A.

As long as a heavy load is not placed on the main CPU 110, the speed at which the main CPU 110 reads image data is faster than the speed at which the document reading CPU 513 writes image data. However, when a heavy load is placed on the main CPU 110, the speed at which the main CPU 110 reads image data slows down. Accordingly, the speed at which image data is read from the host buffer 111a becomes slower than the speed at which image data is written to the host buffer 111a. As a result, as illustrated by a comparative example at time t4, a malfunction occurs in which image data j1 is overwritten by new image data j2 before the image data j1 is read from the host buffer 111a.

The detector 115 detects a first overrun. A first overrun is an example of an overrun. A first overrun indicates that the writing and reading processes are performed in a second order that is opposite to a first order. For example, until the address I, the reading process is performed after the writing process has been performed first in specified storage areas and then the writing process is performed next. In the storage area specified by the address J, however, the next writing process is performed before the reading process is performed.

The main CPU 110 restricts the performance of the writing process by the document reading CPU 513 based on a detection result in which the detector 115 has detected a first overrun. Specifically, the document reading CPU 513 does not perform the writing process. The document reading CPU 513 does not write image data to the storage area specified by the write address. For example, as illustrated in an example at time t4, the document reading CPU 513 does not write the image data j2 in the storage area specified by the address J. That is, the document reading CPU 513 discards the image data j2 acquired by the scanner 51. When the first overrun is no longer detected, the document reading CPU 513 writes image data in the storage area specified by the designated write address. For example, as illustrated in the example at time t5, the document reading CPU 513 writes image data k2 newly acquired by the scanner 51 in the storage area specified by the address J.

Figure 4:
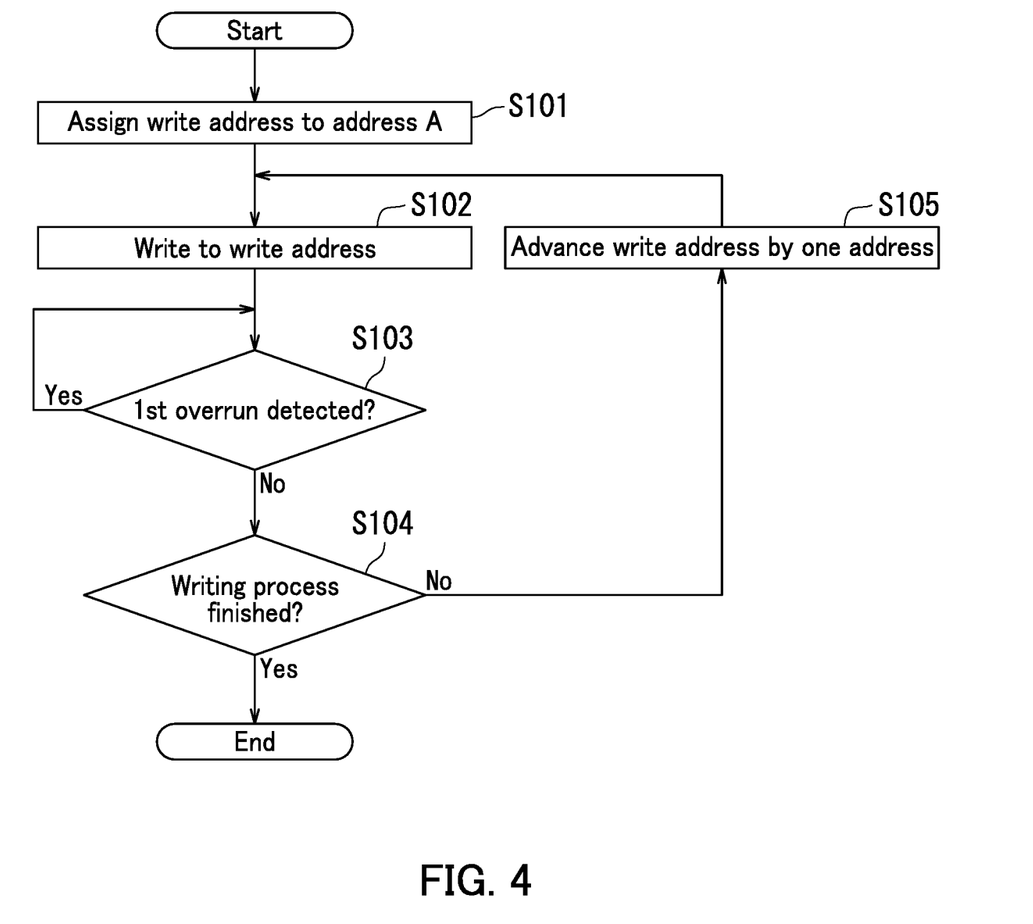
FIG. 4 is a flowchart depicting the writing process performed by the document reading CPU and the reading process performed by the main CPU according to the present embodiment.

The following describes the writing process performed by the document reading CPU 513 and the reading process performed by the main CPU 110 according to the present embodiment with reference to FIG. 4. FIG. 4 is a flowchart depicting the writing process performed by the document reading CPU 513 and the reading process performed by the main CPU 110 according to the present embodiment. The writing process performed by the document reading CPU 513 and the reading process performed by the main CPU 110 include Steps S101 to S105.

In Step S101, the document reading CPU 513 assigns a write address to the address A. Upon the document reading CPU 513 assigning the write address to the address A, the process advances to Step S102.

In Step S102, the document reading CPU 513 writes image data to a storage area specified by the write address. Upon the document reading CPU 513 writing the image data, the process advances to Step S103.

In Step S103, the main CPU 110 determines whether or not the detector 115 has detected a first overrun. When the main CPU 110 determines that the detector 115 has detected a first overrun (YES in Step S103), the process enters a standby state. When the main CPU 110 determines that the detector 115 has not detected a first overrun by contrast (NO in Step S103), the process advances to Step S104.

In Step S104, the document reading CPU 513 determines whether or not all image data has been acquired, or whether or not the writing process has been finished. When the document reading CPU 513 determines that the writing process has been finished (YES in Step S104), the process ends. When the document reading CPU 513 determines that the writing process has not been finished by contrast (NO in Step S104), the process advances to Step S105.

In Step S105, the document reading CPU 513 advances the write address by one address. Upon the document reading CPU 513 advancing the write address by one address, the process returns to Step S102.

According to the present embodiment as described above with reference to FIGS. 1 to 4, the document reading CPU 513 does not write image data when the main CPU 110 determines that the detector 115 has detected a first overrun. That is, a first overrun can be dealt with. Specifically, the next writing process can be prevented from being performed before the reading process is performed. As a result, the document conveyance operation is not suspended. Therefore, the document conveyance operation by the document feed section 6 is not suspended even when a first overrun is detected.

Figure 5:
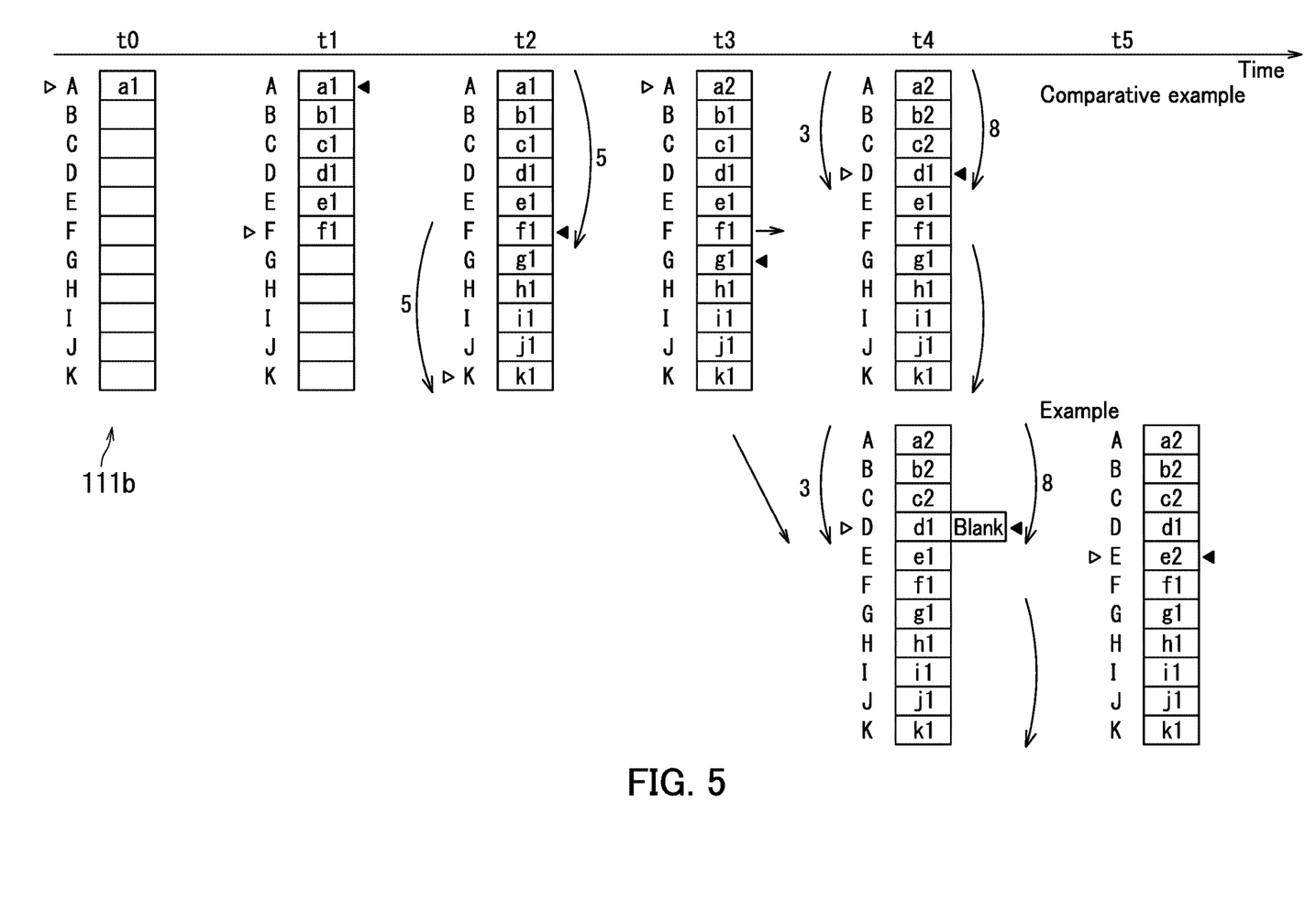
FIG. 5 is a diagram for describing a reading process performed by an image forming CPU and a writing process performed by the main CPU according to the present embodiment.

The following describes a reading process performed by the image forming CPU 46 and a writing process performed by the main CPU 110 with reference to FIG. 5. FIG. 5 is a diagram for describing the reading process performed by the image forming CPU 46 and the writing process performed by the main CPU 110 according to the present embodiment. In FIG. 5, a horizontal axis indicates time. For convenience, addresses A to K are assigned to the storage areas of the print buffer 111b in order from the top. Due to the constraints of the drawing surface, only eleven storage areas are shown in the print buffer 111b illustrated in FIG. 5. However, the number of the storage areas is not limited. Furthermore, the reference sign "111b" is omitted at times t2 to t5. In the reading process performed by the image forming CPU 46, the image forming section 40 forms an image on paper conveyed from the paper feed cassettes 461.

The writing controller 113 of the main CPU 110 performs the writing process. In the writing process, the writing controller 113 designates write addresses and writes image data piece by piece to the storage areas specified by the write addresses in a predefined sequence. Writing pointers (white triangles in the diagram) each indicate a write address to which image data is to be written.

The predefined sequence is a sequence in which the addresses of the print buffer 111b are serially assigned from a starting address A to an ending address K. The first write address is for example the starting address A of the print buffer 111b as illustrated at time t0.

When image data is written to a storage area specified by a write address in the print buffer 111b, the writing controller 113 advances a writing pointer by one address to move a writing target to the next address. Thereafter, as illustrated at time t1, the writing controller 113 writes image data to the print buffer 111b and then advances the writing pointer by one address. Then, as illustrated at time t2, upon the writing pointer reaching the ending address K of the print buffer 111b, the writing controller 113 writes image data to the print buffer 111b and then returns the writing pointer to the starting address A as illustrated at time t3.

The image forming CPU 46 designates read addresses and reads image data piece by piece from the storage areas specified by the read addresses in the predefined sequence from a predefined start timing after the performance of the writing process of the writing controller 113 has been started. Upon the image forming CPU 46 reading the image data, the optical scanning device 42 outputs laser light based on the image data. Reading pointers (black triangles in the diagram) each indicate the read address from which image data is read. The predefined start timing is time t1. Time t1 is one second after time t0, for example.

Specifically, when image data is read from a storage area specified by a read address, the image forming CPU 46 advances a reading pointer by one address to move the reading target to the next address. Thereafter, as illustrated at times t2 and t3, each time the image forming CPU 46 reads image data from the print buffer 111b, the image forming CPU 46 advances the reading pointer by one address. Then, once the reading pointer reaches the ending address K of the print buffer 111b, the image forming CPU 46 reads image data and then returns the reading pointer to the starting address A.

As long as a heavy load is not placed on the main CPU 110, the speed at which the main CPU 110 writes image data is faster than the speed at which the image forming CPU 46 reads image data. However, when a heavy load is placed on the main CPU 110, the speed at which the main CPU 110 writes image data slows down. Accordingly, the speed at which image data is written to the print buffer 111b becomes slower than the speed at which image data is read from the print buffer 111b. As a result, as illustrated in a comparative example at time t4, a malfunction occurs in which old data d1 is read before image data d2 is written to the print buffer 111b.

The detector 115 detects a second overrun. A second overrun is an example of an overrun. A second overrun indicates that the writing and reading processes are performed in a second order that is opposite to a first order. For example, until the address C, the writing process of new image data is performed after the reading process has been performed first, then the reading process is performed next. In the storage area specified by the address D, however, the reading process is performed before the writing process of new image data is performed.

Based on a detection result in which the detector 115 has detected a second overrun, the main CPU 110 restricts reading by the image forming CPU 46 of image data stored in the storage areas and the main CPU 110 directs the image forming CPU 46 to read the predetermined data stored in the non-volatile memory 112. As illustrated in an example at time t4, the image forming CPU 46 reads the predetermined data stored in the non-volatile memory 112 instead of reading image data from the storage area specified by the read address. Thereafter, the image forming CPU 46 advances the read address and reads the predetermined data stored in the non-volatile memory 112 until the second overrun is no longer detected. When the second overrun is no longer detected, the image forming CPU 46 reads image data from the storage area specified by the read address as illustrated in an example at time t5.

Figure 6:
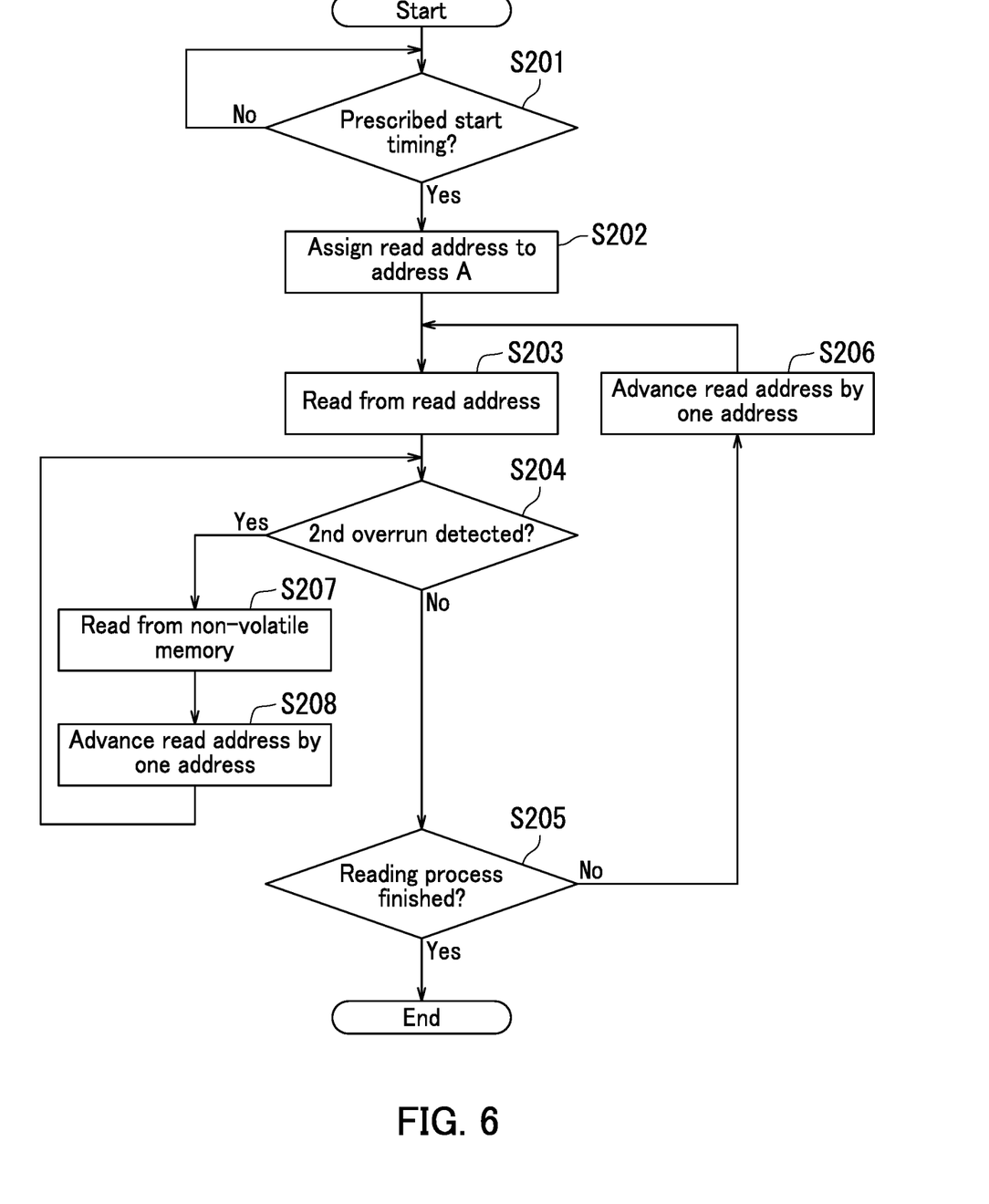
FIG. 6 is a flowchart depicting the reading process performed by the image forming CPU and the writing process performed by the main CPU according to the present embodiment.

The following describes the reading process performed by the image forming CPU 46 and the writing process performed by the main CPU 110 according to the present embodiment with reference to FIG. 6. FIG. 6 is a flowchart depicting the reading process performed by the image forming CPU 46 and the writing process performed by the main CPU 110 according to the present embodiment. The reading process performed by the image forming CPU 46 and the writing process performed by the main CPU 110 include Steps S201 to S207.

In Step S201, the image forming CPU 46 determines whether or not the predefined start timing has been reached. When the image forming CPU 46 determines that the predefined start timing has not been reached (NO in Step S201), the process enters a standby state. When the image forming CPU 46 determines that the predefined start timing has been reached (YES in Step S201), the process advances to Step S202.

In Step S202, the image forming CPU 46 assigns a read address to the address A. When the image forming CPU 46 assigns the read address to the address A, the process advances to Step S203.

In Step S203, the image forming CPU 46 reads image data from the storage area specified by the read address. When the image forming CPU 46 reads the image data, the process advances to Step S204.

In Step S204, the main CPU 110 determines whether or not the detector 115 has detected a second overrun. When the main CPU 110 determines that the detector 115 has not detected a second overrun (NO in Step S204), the process advances to Step S205.

In Step S205, the image forming CPU 46 determines whether or not all image data has been acquired, or whether or not the reading process has been finished. When the image forming CPU 46 determines that the reading process has been finished (YES in Step S205), the process ends. When the image forming CPU 46 determines that the reading process has not been finished by contrast (NO in Step S205), the process advances to Step S206.

In Step S206, the image forming CPU 46 advances the read address by one address. When the image forming CPU 46 advances the read address by one address, the process returns to Step S203.

When the main CPU 110 determines that the detector 115 has detected a second overrun by contrast (YES in Step S204), the process advances to Step S207. In Step S207, the image forming CPU 46 reads the predetermined data from the non-volatile memory 112. Upon the image forming CPU 46 reading the predetermined data, the process advances to Step S208. In Step S208, the image forming CPU 46 advances the read address by one address. Upon the image forming CPU 46 advancing the read address by one address, the process returns to Step S204.

According to the present embodiment as described above with reference to FIGS. 1, 2, 5, and 6, when the main CPU 110 determines that the detector 115 has detected a second overrun, the image forming CPU 46 reads the predetermined data from the non-volatile memory 112. That is, the reading process can be prevented from being performed before the next writing process of new image data is performed. As a result, the conveyance of the paper is not suspended. The image forming CPU 46 then for example forms an image on the paper based on image data indicating blank space. That is, the paper is not suspended from being fed a sheet at a time from the paper feed cassettes 461 and being conveyed to the image forming section 40 even when a second overrun is detected.

The embodiment of the present disclosure is described so far with reference to the drawings (FIGS. 1 to 6). However, the present disclosure is not limited to the present embodiment and may be implemented in various manners within a scope not departing from the gist of the present disclosure (as described below in (1) to (3), for example). Furthermore, aspects of the elements of configuration described in the present embodiment, such as material, shape, and dimension, are one example and not particularly limited. The elements of configuration may be variously altered within a scope not substantially departing from the configuration of the present disclosure.

(1) According to the present embodiment, the non-volatile memory 112 stores therein image data indicating blank space as predetermined data. However, the non-volatile memory 112 may store therein image data indicating data one line before the image data as the predetermined data. The image data indicating data one line before the image data indicates that the same image as a previous image in the printing process is printed. Through the above, the paper is not suspended from being fed a sheet at a time from the paper feed cassettes 461 and being conveyed to the image forming section 40 when a second overrun has been detected.

(2) According to the present embodiment, the document reading CPU 513 writes image data acquired by the scanner 51 in a storage area. However, the document reading CPU 513 may write image data acquired by an element of configuration other than the scanner 51 in the storage area.

(3) According to the present embodiment, the image forming CPU 46 reads image data from a storage area. However, another CPU which uses the image data may read the image data from the storage area.

What is claimed is:

1. An image forming apparatus comprising:
first storage including a plurality of storage areas specified by a plurality of addresses;
a writing controller configured to perform a writing process through which data is written piece by piece to storage areas specified by write addresses among the storage areas;
a reading controller configured to perform a reading process through which data stored in storage areas specified by read addresses among the storage areas is read piece by piece;
a conveyance section configured to convey a recording medium;
a detector configured to detect an overrun;
second storage configured to store blank image data indicating blank space; and
a main controller configured to control the writing controller and the reading controller, wherein
the write addresses are designated in a predefined sequence,
the read addresses are designated in the predefined sequence,
the writing process and the reading process are performed in the storage areas included in the first storage in a first order,
the first order indicates that the reading process is performed after the writing process has been performed,
the overrun indicates that the writing process and the reading process are performed in the storage areas included in the first storage in a second order that is opposite to the first order, and
while the conveyance section conveys the recording medium,
when the detector has not detected the overrun, the main controller directs the reading controller to read the data stored in the storage areas, and
when the detector has detected the overrun, the main controller restricts reading by the reading controller of the data stored in the storage areas, and directs the reading controller to read the blank image data.

2. The image forming apparatus according to claim 1, further comprising
an image forming section configured to form, on the recording medium, an image indicated by the data, wherein
the conveyance section conveys the recording medium to the image forming section, and
the reading controller forms, on the recording medium, either of the image indicated by the data read piece by piece from the storage areas specified by the read addresses or the blank space indicated by the blank image data.

3. The image forming apparatus according to claim 1, wherein
the first storage is a ring buffer.

4. The image forming apparatus according to claim 2, wherein when the detector has not detected the overrun, the reading controller forms the image indicated by the data on the recording medium, and when the detector has detected the overrun,
the conveyance section does not stop conveying the recording medium to the image forming section, and
the reading controller forms the blank space indicated by the blank image data on the recording medium.

5. The image forming apparatus according to claim 3, wherein the second storage is non-volatile memory which stores the blank image data in advance.

* * * * *